United States Patent

[11] 3,595,377

| [72] | Inventors | Lyle E. McCoy<br>Norristown;<br>William L. Kuechler, Jenkintown, both of, Pa. |
|---|---|---|
| [21] | Appl. No. | 865,320 |
| [22] | Filed | Oct. 10, 1969 |
| [45] | Patented | July 27, 1971 |
| [73] | Assignee | Proctor & Schwartz, Inc.<br>Philadelphia, Pa. |

[54] CIRCULATING BALL CONVEYOR
16 Claims, 9 Drawing Figs.

[52] U.S. Cl. .................................................. 198/181,
198/189, 59/78, 104/135
[51] Int. Cl. ................................................. B65g 15/00
[50] Field of Search .......................................... 198/181,
189, 137, 59/78, 104/135

[56] References Cited
UNITED STATES PATENTS

| 449,126 | 3/1891 | Little .......................... | 104/(135) |
| 821,704 | 5/1906 | Conway ...................... | 104/(135) |
| 2,855,092 | 10/1958 | Beech .......................... | 198/181 |
| 3,094,206 | 6/1963 | Stewart et al. ............. | 198/181 |

*Primary Examiner*—Gerald M. Forlenza
*Assistant Examiner*—Jerold M. Forsberg
*Attorney*—Robert S. Vermut ABSTRACT: A conveyor comprising at least one articulated member such as a chain having a substantially continuous groove in at least one of the faces thereof formed by groove portions in corresponding faces of the elements comprising the articulated member, at least one track member having a groove in opposition to said substantially continuous groove and defining therewith a race containing a plurality of balls, the dimensions of the race and balls being so related that the balls are stably contained within the race, the race being nonlinear at least in part. The relationship of articulated member and track member permits proper circulation of the balls within the race without locking and permits movement of substantial loads in an articulating manner over greater distances while under a substantially reduced power requirement.

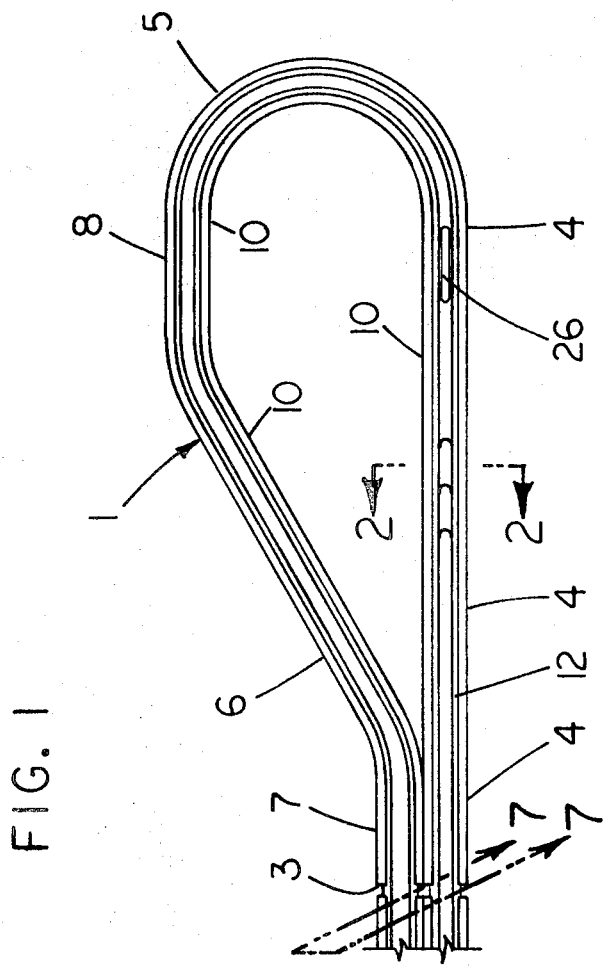
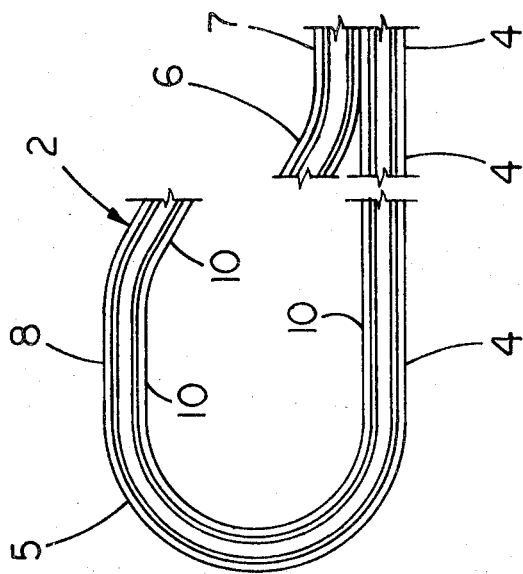
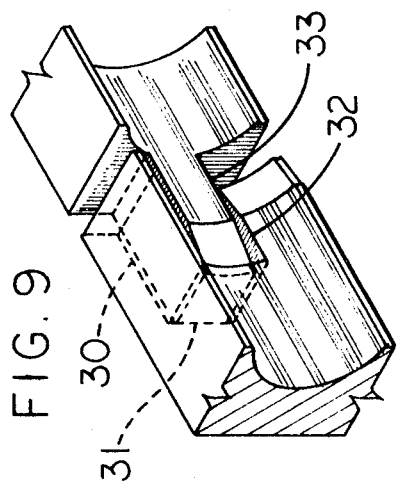

INVENTORS
LYLE E. McCOY
WILLIAM L. KUECHLER
BY Robert S. Vermut
ATTORNEY

INVENTORS
LYLE E. McCOY
WILLIAM L. KUECHLER
BY Robert S. Vermut
ATTORNEY

CIRCULATING BALL CONVEYOR

BACKGROUND OF THE INVENTION

1. Field of the Invention

This invention relates to the field of conveying apparatus and, more particularly, to endless conveyor systems having articulated carrier members for tenter application.

2. Description of the Prior Art

Since the preferred embodiment disclosed infra relates to a tenter application, the following description of the prior art is directed specifically thereto—even though other applications are within the scope of the present invention.

To enhance the quality of fabrics, bleaching, dyeing, pressing and/or ironing have been practiced for hundreds of years. The earliest methods of bleaching and drying dyed fabrics was to lay the goods flatly under the sun or hang them on racks or clothes lines. Aside from the problems encountered by inclement weather, the biggest disadvantage to the latter methods was uncontrolled shrinkage. Remedies for this disadvantage, such as wooden frames, were initially developed to hold sections of fabric to dimension, and later developments centered on the tenter frame. The tenter frame basically consists of two parallel chains with pin or hook attachments to engage the selvedges of woven fabrics. Tenter frames not only have been used to obtain predetermined shrinkage but have been used to hold drying cloth to maximum width preventing natural shrinkage. Currently, with modern fabrics, shrinkage is no longer as major a problem or consideration, and the tenter frame is now used for many varied and beneficial finishing functions including the preparation of the fabric for modern shrinkage control processes.

For woven goods, tenters are provided with grippers or clips attached to an endless chain running in tracks. To facilitate fabrication and erection, the tracks are sectionalized into 10-foot long sections and supported 40 to 42 inches off the floor on stands or cross bridges equipped with screws to adjust the parallel tracks to fabric width. Sometimes the tracks or rails guiding the chain are not held completely parallel for the entire frame length as, e.g., in plastic film orienting or certain heat setting operations, and a pivoting joint is required at each 10-foot track section end.

Since most fabrics vary in width before tentering, the entry 10-foot track section must be fitted with a pivoting joint and equipped with any number of possible fabric edge sensing devices which in turn control a track positioning actuator, a screw end reversing motor or rack and pinion or hydraulic cylinder, et cetera. The track and, therefore, the clip gripping line or pin line (the latter for nonwovens) attached to the chain is moved to the position of the fabric edge for engagement. Generally the entry rail is permitted to swing inwardly about eight to 10 degrees from parallel and outwardly about three to four degrees. Also, the last section or delivery end tracks are generally fixed with a one degree inward toe to relieve tension on the fabric for easier depinning or declipping.

Since the modern tenter frames are usually enclosed over the center sections with heated housings or dryers, the chain tracks must have expansion joints and chain tensioning devices to adjust for wear.

Tenter chains now in use are generally sliding friction devices. Some have rollers which usually wear rapidly so that the chains initially with rollers become sliding chains. Some tenters have roller chains which are primarily high speed sliding chains where the rollers only facilitate tooth engagement with the end sprockets. With sliding chains, the use of dissimilar materials, lubrication and reasonably close tolerances are practiced.

In a processing range with other equipment, the motors of the tenters with sliding chains on the range drive become rather large and very expensive, requiring in most cases synchronization at the very limit of current technology or about plus or minus one-tenth of 1 percent of speed range. At a range speed of 100 yards per minute, errors of plus or minus 3 inches per minute are common and do cause damage to fabrics such as distortion tears or wrinkles occurring between synchronized components. The usual range of accuracy is about plus or minus 1 percent for range drives and these in a high horsepower rating of 25 to 40 horsepower can cost almost as much as the tenter frame itself. A 90-foot long clip type tenter frame good for about 120 yards per minute usually has a 30 horsepower drive. At 240 yards per minute, the frame could easily require a 50 or 60 horsepower variable speed drive with tachometer feed back, controlled acceleration and braking, et cetera.

Most tenter frames are only occasionally over 90 feet long and operate at top speeds of about 150 yards per minute. Lengths have not been increasing and improved performance of the drying housings does not result in a trend to increase frame lengths. The trend has been to shorten length with increased processing rate while maintaining previous maximum chain speeds. Higher speed frames have been developed for plastic film processing but these are of much heavier construction and cost about four to six times a standard duty tenter frame. Film frames of 90 feet have been run up to 330 yards per minute but normally run at approximately 200 yards per minute.

The two basic differences between the sliding chain of the prior art and the ball chain of the present invention are (1) a great decrease in chain pull to both start the chain moving and to run (breakaway chain pull for a 20-foot long (44-foot total) circulating ball steel chain was 35 pounds. Running pull was 20 to 25 pounds at low speed. In accordance with published coefficient of friction data and preliminary tests, pulls with sliding chain are expected to be about five to 10 times greater), and (2) the end turnarounds on the ball chain are merely bent tracks and no end chain sprocket is required. If a ball chain link pin should break the chain might gap slightly but it would still be completely retained within the track. A change in normal noise of the chain would indicate this malfunction and the unit could be safely shut down. With the sliding chain, there have been cases of chain breakage with the loose trailing end whipping off the end sprocket and causing tremendous damage. This potential hazard and the diminishing strength/weight to sprocket diameter ratio are limiting factors for high speed with sliding chains. As the speed goes up the sprocket diameter must be increased to reduce acceleration at the turns, and as speed increases, the chain connecting pins and link webs must get heavier to be stronger, and as the pins and webs get heavier, they have more acceleration mass at the turns thus requiring additional strengthening ad infinitum.

It appears that the performance versus cost ratio for sliding chain tenters has reached a limit due to the strength of of drive size versus cost ratio, and operator safety factors versus cost. It is believed that a low friction, lightweight conveyor such as embodied by the present invention will permit overall single range increases of two or three times the existing limit.

SUMMARY OF THE INVENTION

This invention is directed toward the relationship of at least two relatively moving, opposed members defining a race stably containing a plurality of balls, at least one member being articulated and the other being nonlinear at least in part.

The invention is preferably embodied in an endless, moving articulated member having a substantially continuous groove in opposition to a substantially continuous groove of a stationary track member, nonlinear in part, to define therewith a ball race. The configuration and dimensions of the race and balls are related to each other on the basis of the linearity of the race.

It is therefore an object of the present invention to provide more efficient conveying apparatus with greatly reduced complexity of components.

BRIEF DESCRIPTION OF DRAWING

FIG. 1 is a plan view of a conveyor section embodying the present invention joined to a mirror-image section shown in part;

FIG. 9 is a perspective view of a tongue and groove joint connection.

DESCRIPTION OF THE PREFERRED EMBODIMENT

Figure 2:
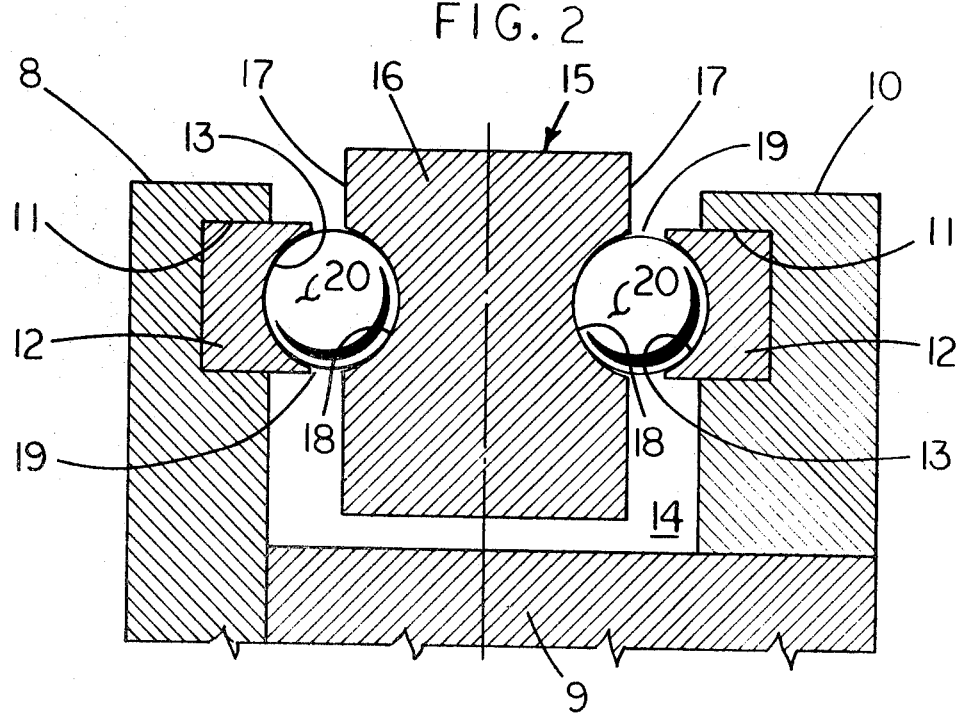
FIG. 2 is a sectional view along line 2-2 of FIG. 1 showing in particularity the ball races.

Referring now more particularly to the drawing with reference numerals, in FIG. 1, a conveyor section generally designated at 1 is joined as at 3 in mirror-image to an identical section 2 shown in part. The section comprises a linear portion 4, and arcuate, nonlinear portion 5, a linear portion 6 angularly oriented with respect to portion 4, and a linear portion 7 which extends parallel to the portion 4.

It should be noted that in a tenter application the combined sections 1 and 2 may be oriented as shown in FIG. 1 with a corresponding mirror-image combination of sections adjacent thereto in coplanar, spaced relation so that the pairs of substantially aligned portions 4 are substantially parallel and spaced apart from each other a distance substantially equal to the width of the desired tenter application. The distance between substantially parallel portions 4 is initially set to the desired material width and sensing means may be utilized to further adjust the initial distance between the portions 4. Changes in width elsewhere in the tenter length may be accomplished by pivoted movement at the joints 3 to be described in more detail below. Of course, joined sections 1 and 2 may be maintained in a vertical plane rather than in the horizontal plane shown in FIG. 1 with an adjacent pair of joined sections also in a vertical plane in substantially parallel spaced relation thereto with the pairs of substantially aligned portions 4 again in substantially parallel spaced-apart relation a distance sufficient to accomplish the desired tenter application. Furthermore, the use of any number of sections may be had to provide desired conveyor length with intermediate sections, either linear or nonlinear or both, extending between sections 1 and 2. In an application of any number of sections, it is desirable to maintain sections 1 and 2 as the end sections but other configurations, of course, may be used within the scope of the present invention.

As seen in FIG. 2, section 1 and mirror-image section 2 (and any intermediate sections, not shown) comprise an outer support 8 which is closed throughout its defining area by a base plate 9 upon which is mounted and to which is secured an intermediate support 10 of varying width. Each of the supports has a substantially coplanar recess 11 which receives a track member 12. The track member may be secured to the support members 8 and 10 in any suitable manner including welding or by being frictionally retained. Each of the exposed faces of the track members 12 is arcuately grooved at 13 to provide pairs of opposed grooved surfaces.

In the area generally designated as 14 defined by the supports 8 and 10 and the base plate 9 is received an articulated member generally designated at 15. The member 15 is preferably an endless chain and comprises a body portion 16 having a pair of faces 17 each having an arcuate groove 18 therein corresponding to an opposed groove 13 which together define races 19 receiving balls generally designated at 20. It can thus be seen that the articulated member 15 is supported by supports 8 and 10 solely by means of the balls 20.

Figure 3:
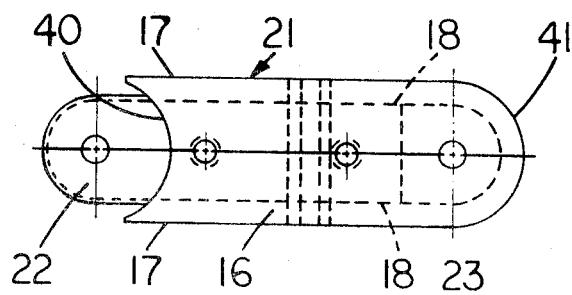
FIG. 3 is a plan view of a link element of the articulated member.
Figure 4:
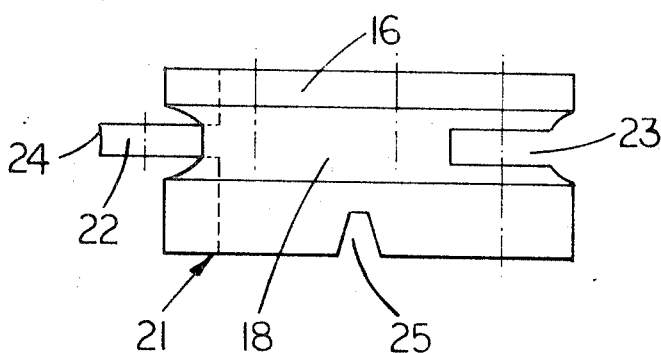
FIG. 4 is an elevational view of a link element of the articulated member.
Figure 5:
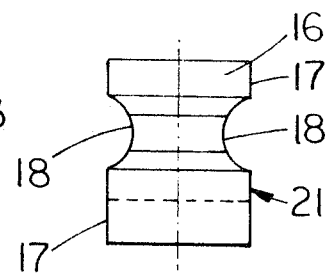
FIG. 5 is an end view of a link element of the articulated member.

Referring now to FIGS. 3, 4 and 5, a link element generally designated at 21 of the articulated member 15 is shown. The element includes the body portion 16 referred to hereinabove, a tongue portion 22 and a groove 23 for receiving the tongue 22 of the next adjacent element of the articulated member 15. As also referred to hereinabove, the body portion 16 includes arcuate grooves 18 with which the peripheries of the tongue and grooves 22 and 23 are continuous. The tongue, additionally, has a concave peripheral configuration 24 to supplement its continuity with the grooves 18 to provide a smooth, efficient transition of balls to adjacent elements in travelling the nonlinear part of the track member. In a tenter application, the link elements are adapted to secure clamps or pin plates, not shown, for holding the material being conveyed. The body of the element 21 also has a recess 25 for receiving a gear tooth of the drive sprocket. As seen in FIG. 1, the base plate 9 is slotted at 26 to provide access to the grooves 25 by the drive sprocket teeth, not shown, as the grooves 25 pass over the slot 26.

Figure 6:
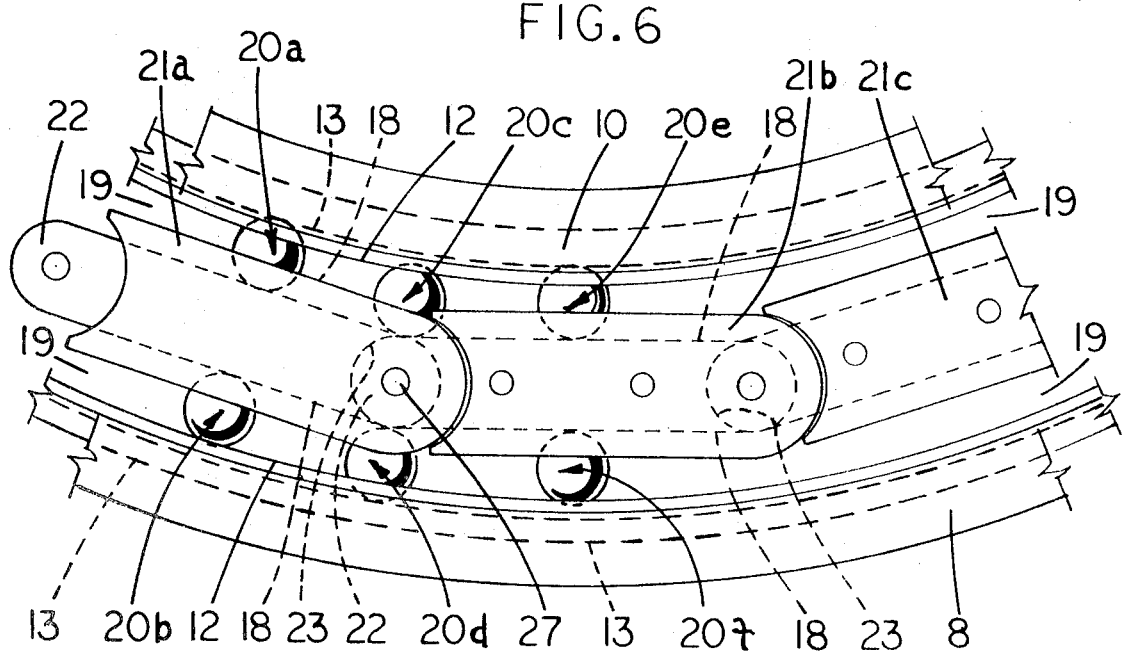
FIG. 6 is a plan view of the relationship of the articulated member, balls, and nonlinear race portions.

FIG. 6 shows a plurality of elements 21 joined by the tongue 22 and groove connections therebetween. Since the member 15 is articulated, the connection between the elements is by a pivot pin 27. The radial distance between the supports 8 and 10 is slightly greater on the nonlinear portions of the races 19 than the distance therebetween on the linear portions in order to accommodate the articulation of the elements 21 with respect to each other. Thus, because the dimensions of each race as defined by opposed grooves 13 and 18 varies on a nonlinear race portion by the pivotal movement of the elements 21, the overall dimension between supports needs be increased slightly to accommodate the balls 20 and dimensional changes and to maintain smooth operation.

For purposes of further detail, the balls and elements of FIG. 6 have been numbered generally 20a through 20f and 21a through 21c, respectively. Therefore, it can be seen that the particular articulated positions of elements 21a and 21b are such that the balls 20b, 20c and 20f are substantially within respective grooves 18 but substantially without respective grooves 13 while the other balls 20a, 20d and 20e are partially in each of their respective grooves 13 and 18. None of the balls (if a proper number are employed) can fall from the nonlinear race portions, even with greater dimensions, because of the retention thereof in the outer opposed groove 13 or 18 by centrifugal force, or because the dimension between the most adjacent points of the grooves 13 and 18 will not permit fall out. However, if an insufficient number of balls are used, ball fall out may occur when one side 17 of the link element 21 abuts against the insert 12 leaving an abnormally widened race on the other element side. Of course, if too many balls are used, as, e.g., the races are completely filled, the combination of constant speed of member 15, centrifugal forces, shortening of the exposed groove 18 with respect to the inner race nonlinear portion because of the articulation of member 15 (see FIG. 6), and lengthening of the exposed groove 18 with respect to the outer race nonlinear portion because of the articulation of member 15 (see FIG. 6) at the nonlinear race portions will cause a binding or locking effect resulting in the stopping of relative movement.

Figure 7:
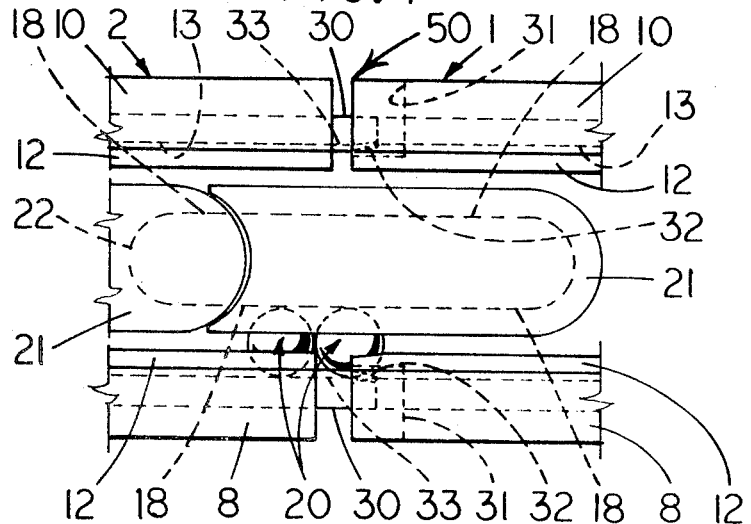
FIG. 7 is a plan view of a part of the joint between the conveyor sections shown in FIG. 1 taken along line 7-7 thereof.

FIGS. 1, 7, 8 and 9 show a joint between the sections 1 and 2 of the tongue and groove type with the tongues 30 extending from one section at the respective support members 8 and 10 into grooves 31 in support members 8 and 10 of the other section (or intermediate section(s) if desired). As can be seen in FIG. 7, the tongues 30 extend from the inserts 12 of section 2 and have grooved opposed faces 33 which continue the grooves 13. The tongues 30 also have an inward taper 32 of approximately 5 degrees at their respective ends for the purpose to be described hereinafter.

When, in a tenter application, changes in pin or clip direction and/or opposed, spaced distance are desired, the tenter conveyor sections 1 and 2 may accommodate such changes by pivoting the sections 1 and 2 about the center of rotation 50. Thus, the races defined by the elements 21 and the members 8 and 10 as shown in FIG. 7, may be limitedly pivoted outwardly or inwardly in relation to corresponding races of another pair of conveyor sections to provide the desired direction and/or distance.

As the members 8 and 10 of the sections 1 and 2 take on an angular relationship, the increasingly exposed groove 33 in the tongue 30 assists in maintaining the continuity of the substantially aligned grooves 13 so that the balls may smoothly pass from the race of one section to the race of an adjacent section. This continuity is also furthered by the taper 32 which assists in maintaining the race configuration between sections when rotation of the sections opens the gap therebetween. When the gap between sections opens on one side of center 50, the gap closes on the other side, not shown in FIG. 7. In a gap closing, the tongues 30 will not play as substantial a part in the continuous movement of the balls because of the limited exposure of the tongues to balls. Of course, the orientation of tongues 30 and grooves 31 may be reversed so that section 1 has the tongues and section 2 has the grooves, or, of course, each section may have one or more tongues or grooves following the requirement that the continuity of grooves 13 be maintained in any operational position of sectional rotation.

Figure 8:
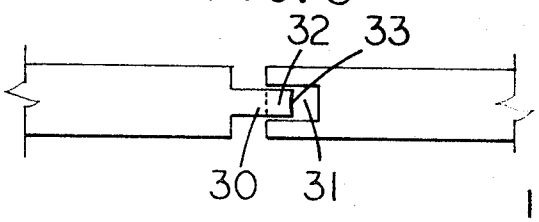
FIG. 8 is an elevation view of the joint shown in FIG. 7.

FIGS. 8 and 9 show the relationship between tongues 30 and grooves 31 with the grooves being of greater width than the tongues to accommodate the rotational movement thereof.

The relative dimensions of the races with respect to the number of balls and the dimensions thereof are critical to the operation of a conveyor of the present invention. It has been found that the packing of the races with balls of sufficient number to provide continual contact is not conducive to proper functioning since, at high speeds under constant articulated member speed, centrifugal forces, and changes in the exposed lengths of the grooves 18 due to articulation of the member 15 at the nonlinear race portions, the balls tend to bind or lock in the races. Therefore, less than a maximum number of balls is required. Also, as stated previously, the dimensions of the races at their nonlinear portions must be more flexible than the dimensions on the linear portions need be in order to accommodate the pivotal movements of the articulated member. Improper dimensioning, of course, can result in either a locking or binding of the balls or a dropping out of the balls from within the races. The balls, also, must be of less dimension than the dimensions defining the grooves 13 and 18 to permit noncoplanar movement where bunching occurs, and, yet, relatively dimensioned to preclude dropping out of the races during articulation of the member 15 or otherwise. It should be noted that the outermost support member 8 of each of the races should be tapered outwardly slightly before a turnaround in order to accommodate the initial articulation of the member 15 while the inner support member 10 of each race needs only enter its turnaround curvature in conformity with the outer member curvature.

Since ultimate operational efficiency of a conveyor embodying the present invention will require trial and error experimentation under the above guidelines with respect to the number of balls within the races in order to preclude a locking or binding effect, and since the dimensions of races and balls must be predetermined to preclude dropout of balls and any binding or locking effect, the following dimensional details of a conveyor as shown in FIG. 1 are given as a working example. The overall dimensions of the linear portion 4 of section 1 may be 120 inches in length with the nonlinear portion 5 having a radius of curvature of approximately 8 inches to the center line of a link element 21. The innermost part of groove 13 of the inner race along its nonlinear portion 5 may have a radius of curvature of 7.109 inches and the corresponding radius of curvature of the outer race along the outermost point of its groove 13 may be 8.797 inches. The latter dimensions, of course, are based on a ball diameter of 0.484 inch, the distance between tangents to the innermost points of the grooves 18 of elements 21 being 0.620 inch. See FIG. 2. The effective length of the elements 21 may be 2.500 inches and the distance between tangents to the innermost points of curvature of the opposed grooves 13 of members 8 and 10 may be 1.588 inches on the linear portion of the section 1. Thus, it can be noted from the above dimensions that the nonlinear race, radial distance between opposed grooves 13 is approximately 0.10 inch greater than the corresponding linear race distance in order to provide for articulation of link elements 21. The width of the section adjacent the joint may be 7 inches, the length of the portion 7 may be 6 inches and the length of the portion 8 may be 21¾ inches. The width of each of the elements 21 may be 1 inch and the radius of curvature of the grooves 18 on each element 21 may each be 0.25 inch. The inserts 12 may each be of a height of approximately 0.505 inch and be received within the support 8 a distance of 0.25 inch. The portion 6 may be at a 172 degree angle with respect to the portion 7, and the slot 26 may be of a length of approximately 8 inches in order to provide access for a drive sprocket of 10.595-inch outside diameter. The inner and outer race grooves 13 may have a depth of 0.165 inch, both grooves having a radius of 0.25 inch. The recommended range of numbers of 0.484-inch diameter balls for the inner and outer races of conveyor combined sections 1 and 2 in mirror-image as shown in FIG. 1 is 20—30 balls less than maximum and 40—50 balls less than maximum, respectively.

The linear portion of each section as defined in part by the portion 7 may also include access to each of the races so that the balls may be inserted, or increased or decreased in number. This access may merely comprise a releasable cutaway of the support 8 and insert 12 of sufficient dimension to pass a ball 20 into and out of the race defined by the grooves 13 and 18. Of course, access might be made available at any point on either the inner or outer race. A cover plate, not shown, for the sections conforming in configuration to the configuration of the outer support member 8 may be utilized with a removable section over the ball-race access area.

The circulating ball tenter chain is an articulating chain ranging from about 2 to 3-inch pitch length per link. Pitch could be made longer but turning radii would have to be much bigger. Too large an unsupported span of fabric could result in permanent damage so normally pin plates range from about 2 to 5 inches long. If it is required to use 5-inch long plates, attachment could be made to alternate chain links. For clip frames, clips are generally 4 to 5 inches long, the limiting factor being the clearance gap between adjacent jaws and inward bends of the chain. Clips could be attached to alternate chain links, which could be of different lengths as, e.g., attaching a 3-inch link and an alternate free 2-inch link.

As with the sliding chains, ball chain cracks and hinge gaps must be relieved to prevent noise and possible tear-ups. This is accomplished by the relieved tongue and groove joints between section and link elements. Relief of the tongue and groove joints between elements 21 is more critical on the outer race than the inner race due to a greater centrifugal force effect, and, thus, the change in certain dimensions of the nonlinear race portions to allow for noncoplanar ball movement. On the linear race portions, the clearance of the balls must be relatively tight to prevent twisting of the chain and deflection from the true cloth line. An arcuate-type race has been shown but a V-type or other configuration may also be used. With the arcuate type race, the grooves 13 and 18 should have a radius 51.6 percent of ball diameter. Thus, as in the example supra, a ball diameter of 0.484 inch gives rise to a groove radius of 0.250 inch.

To increase the speed of the ball chain and still maintain safety, it is necessary to increase the strength of the outer support member 8. The articulated member needs be designed only for the nominal loads imposed by fabric tension on the linear runs and for chain pulls reflecting usable work, not acceleration, around nonlinear runs at high speeds. While for current low speeds in a tenter application, a gear engaging gear slots on the articulated member is recommended for driving and synchronizing a pair of articulated members, high speed tenter or other applications would require a friction wheel or device drive to preclude gear tooth wear and minimize load. A suitable friction drive for tenters would have to incorporate some suitable synchronization system and could become very complex.

Certain plastic, glass, and other materials might be used for balls and/or other structural members although the preferred embodiment utilizes steel predominantly. Lubricants can be used to meet certain application conditions and could be any of the new solid film lubricants.

Although the preferred embodiment has been set forth above with an articulated member represented as a chain, the term "articulated member" is intended to include a member comprising a plurality of independent elements (e.g., the member 15 without pivot pins) which may be pushed around and any flexible carrier of the chain, cable or belt et cetera type may be utilized. Also, although the preferred embodiment shows an endless articulated member, the possibility of a terminated member being pulled or pushed is possible.

Although the preferred embodiment is directed toward a tenter application, the present invention may be applied to any situation of relative load transfer movement as, e.g., a monorail system. In any event, the present invention encompasses the construction of a system in which there are primary and secondary track members wherein the secondary track members are in themselves articulated members which move relative to the primary track members and relative to the load bearing, articulated member. Components of the present invention may vary from simple, inexpensive, stamped, extruded, or similar mass produced elements to precision machined, hardened and ground elements for maximum loads, feeds and durability.

As will be seen from the above, the present invention has a lower force and power requirement with greatly reduced complexity of secondary mechanical elements. Also, the opposed track members may be suitably loaded with spring tension, cammed, et cetera, to maintain proper clearances, adjust for wear or expansion, and provide additional relief at joints when forming turns.

Since the preferred embodiment may be modified in numerous ways, as, e.g., by changing the configuration of the grooves 13 and 18, by utilizing relatively movable track members, et cetera, the preferred embodiment should be viewed as illustrative and not in a limiting sense.

What we claim is:

1. Conveying apparatus comprising an articulated member having a plurality of faces and supporting means being conveyed, groove means in at least one of said faces, track means in at least partial opposition to said articulated member, said track means having groove means defining with the groove means of said articulated member a ball race nonlinear at least in part, said race containing a plurality of balls being relatively dimensioned with respect thereto to provide relative motion between said articulated member, said track means and said balls, and said plurality of balls within said race being of less number than the maximum number of balls receivable within said race, said articulated member being endless, said groove means in said member and said track means being substantially continuous with any noncontinuity therein being of less dimension than the diametric dimension of any of said plurality of balls, and said groove means in said member and said track means defining an endless race with said plurality of balls supporting said member at least in part.

2. The apparatus set forth in claim 1 wherein said member has groove means in at least one of its other faces, said track means comprises at least two rail members each having a face in at least partial opposition to said articulated member and to each other, said groove means of said track means comprises a pair of grooves in respective opposed faces of said at least two rail members, said grooves defining with respective groove means of said articulated member a pair of ball races nonlinear at least in part, and each of said races containing a plurality of balls supporting said articulated member at least in part.

3. The apparatus set forth in claim 2 wherein said plurality of balls in each of the races is the sole support of said articulated member.

4. The apparatus set forth in claim 3 wherein the grooves of said rail members and the groove means of said articulated member are substantially coplanar.

5. The apparatus set forth in claim 1 wherein said endless race comprises a plurality of sections each joined to the other by tongue and groove means on adjacent track means.

6. The apparatus set forth in claim 5 wherein said tongue and groove means are coplanar with the groove means of said track means and said tongue means has a tapered nose portion and a peripheral longitudinal groove so that adjacent sections when joined may be pivoted with respect to one another and said tongue and groove means may provide continuity in the groove means of adjacent track means.

7. The apparatus set forth in claim 2 wherein the minimum distance between the at least partially opposed faces of said rail members at the grooves of the nonlinear parts of said races is greater than the corresponding minimum distance between the at least partial opposed faces of said rail members at the grooves of the linear parts of said races.

8. The apparatus set forth in claim 1 wherein said articulated member comprises a plurality of elements each having at least one groove and the grooves of said elements being substantially coplanar to provide the groove means of said member.

9. The apparatus set forth in claim 1 wherein said articulated member comprises a plurality of elements each having a tongue at one end and a groove coplanar with said tongue at the other end, said tongue being received within the groove of an adjacent element and a pin connecting adjacent elements through said tongue and groove to permit pivotal movement.

10. The apparatus set forth in claim 9 wherein said tongue has a peripheral longitudinal groove so that when said tongue is received within the groove of an adjacent element the groove means of said articulated member is substantially continuous.

11. The apparatus set forth in claim 1 wherein a second articulated member identical to the first-mentioned articulated member and second track means identical to the first-mentioned track means are positioned in spaced relation with respect to the first-mentioned articulated member and track means, and drive means engaging both articulated members in synchronization to provide a tenter frame.

12. Conveying apparatus comprising an endless articulated member and a pair of substantially continuous track members defining a space into which said articulated member is received, said articulated member comprising a plurality of elements each having a pair of substantially parallel faces, said faces each having a longitudinal groove providing said articulated member with a pair of substantially continuous parallel grooves therein, each of said track members having a substantially continuous groove therein in opposition to a respective one of said substantially continuous grooves of said articulated member, all of said grooves being substantially coplanar to define a pair of endless ball races nonlinear at least in part, said races containing a plurality of balls therein, said balls being the sole support of said articulated member and being dimensioned relative to said races to permit relative motion between said articulated member, said track members and said balls, and said plurality of balls being less in number than the maximum number of balls which may be received within said races.

13. The apparatus set forth in claim 12 wherein said endless races are defined by a plurality of track elements joined together by a plurality of tongue and groove connections, said tongue and groove connection being coplanar with the groove of the respective track member, and said tongue being tapered and having a peripheral groove therein to provide substantial continuity in the groove of the track member.

14. The apparatus set forth in claim 12 wherein each of said elements of said articulated member has a tongue at one end and a groove coplanar with said tongue at its other end, each tongue being received within the groove of an adjacent element and pivotally fixed thereto by a pin, and each of said tongues has a peripheral groove providing with the longitudinal grooves of each element the substantially continuous parallel grooves of said articulated member.

15. The apparatus set forth in claim 12 wherein the minimum distance between track members at the grooves of the nonlinear parts of said races is greater than the minimum distance between track members at the grooves of the linear parts of said races.

16. The apparatus set forth in claim 12 wherein a second articulated member identical to the first-mentioned articulated member and a second pair of track members identical to the first-mentioned pair of track members are positioned in spaced relation with respect to the first-mentioned articulated member and pair of track members, and drive means engaging both articulated members in synchronization to provide a tenter frame.